United States Patent

[11] 3,566,995

[72] Inventor: Hans Joachim Anders, Frankfurt am Main, Germany
[21] Appl. No.: 782,849
[22] Filed: Dec. 11, 1968
[45] Patented: Mar. 2, 1971
[73] Assignee: Alfred Teves G. m.b.H., Frankfurt am Main, Germany
[32] Priority: Dec. 15, 1967
[33] Germany
[31] P 16 25 831.4

[54] DISK-BRAKE BRAKESHOE
5 Claims, 5 Drawing Figs.

[52] U.S. Cl. ................................................ 188/73.1; 188/250
[51] Int. Cl. ................................................ F16d 66/02
[50] Field of Search ........................................ 188/1 (A), 73, 250 (B), 205.3

[56] References Cited

UNITED STATES PATENTS

| | | | |
|---|---|---|---|
| 3,113,643 | 12/1963 | Botterill | 188/73 |
| 3,368,519 | 2/1968 | Ruda | 188/1(A)X |
| 3,460,652 | 8/1969 | Botterill | 188/73 |

OTHER REFERENCES

| | | | |
|---|---|---|---|
| 1,204,084 | 10/1965 | German printed Application Tenes | 188/250(B) |

Primary Examiner—George E. A. Halvosa
Attorney—Karl F. Ross

ABSTRACT: A disk-brake brakeshow has a backing plate carrying a brake lining. This plate has a portion bent toward the disk along a bend line which is removed or offset from the center of the shoe and is generally directed toward the center of a brake disk. When the brakeshoe is greatly worn, the trailing, inwardly bent edge contacts and scrapes against the brake disk, thereby creating an audible signal for the driver, without imparting braking characteristics since the major portion of the lining remains effective at least until the operator of the vehicle has recognized the danger and had an opportunity to replace the brakeshoe or have the backing plate relined.

INVENTOR:
Hans J. Anders

BY
Karl F. Ross
Attorney

Hans J. Anders
INVENTOR.

BY Karl F. Ross
Attorney

DISK-BRAKE BRAKESHOE

My present invention relates to disc-brake brakeshoes and, more particularly, to a brakeshoe having means for preventing brake squealing and noise.

In my commonly assigned copending application Ser. No. 672,757, filed 12 Dec. 1966, now abandoned, and commonly assigned U.S. Pat. No. 3,409,106, issued to Ernst Meier and Hermann Seip on 5 Nov. 1968, there are describe systems for reducing the noise produced by disc brakes upon the application of brake pressure.

In these applications it is pointed out that, when the brake piston bears centrally (i.e. along its axis) upon the backing plate of a brakeshoe, the nonuniform wear of the brake lining due to higher surface speeds at greater distances from the center of rotation of the disc results in a canting of the brakeshoe which is associated with the generation of brake noise during the application of the disc brake.

A disc-brake system of this general type comprises a fixed yoke or housing whose lobes are disposed on opposite sides of a brake disc which is rotatably secured to the axle or wheel of the automotive vehicle; the lobes are connected by a bridge piece.

It has been noted in the commonly assigned, copending application Ser. No. 687,043, filed 30 Nov. 1967, by J.R. Botterill and entitled "Anti-noise Disc Brake," now U.S. Pat. No. 3,460,652 that it is unnecessary to wait for a brake-lining wear of about 10—15 percent, as has been the case when intervening plates having a thickness of about 1 mm. have been introduced to render the contact between the piston and the brakeshoe off center, or to reduce the thickness of the brake lining if an intervening plate is to be used from the beginning, when the disc-type brake has a piston whose annular end confronting the brakeshoe is stepped (i.e. provided with at least three steps) to afford a limited zone of contact with the backing plate of the shoe.

This latter application further discloses that the hydraulic disc brake, which does not require an intermediate plate, can effectively be provided with a wheel-brake piston of cylindrical cup-shaped configuration which opens in the direction of the backing plate of the brakeshoe. The piston thus has an annular rim juxtaposed with the backing plate of the brakeshoe and forming the contact surface by which the piston applies force to the shoe. To minimize brake noises and especially squealing without changing the usable thickness of the brake lining and without using an intermediate plate, the piston is provided with a plurality of axially staggered but planar steps, i.e. at least three axially staggered zones, which lie in planes parallel to the backing plate of the disc but are offset one from the other by cutting away the annular contact end of the piston. Advantageously, the third step has a height less than the first step and of approximately 0.1 mm. The third or additional step is closest to the backing plate and is compressible.

BACKGROUND OF THE INVENTION

These prior-art devices do indeed make for a disc brake which is virtually squeal-free, yet they are relatively expensive to produce. Furthermore, they provide no means of warning the driver when his brakeshoes are worn dangerously low, and therefore need replacement.

OBJECTS OF THE INVENTION

It is the principal object of my invention to provide a brakeshoe which has the antisqueal properties of the a abovementioned devices, while being relatively inexpensive to manufacture.

A further object of my invention is to provide such a brakeshoe that warns the driver when his brakes need servicing i.e., when the brakeshoes are worn dangerously low, without greatly impairing the braking characteristics of the vehicle.

SUMMARY OF THE INVENTION

I do this through the surprisingly simple expedient of providing a brakeshoe with a backing plate that has a portion which is bent toward the disc and away from the piston along a rectilinear bend or ridge line. In this way the off center support of the brakeshoe is ensured without major redesigning of the brake piston.

In addition the forwardly bent edge of this backing plate, on pronounced brakeshoe wear, will rub or scrape the disc giving rise to a simple audible signal readily recognizable as indicating metal-to-metal contact and the erosion of the intervening brake lining. Upon onset of this signaling the driver can safely continue driving, since, in contrast to normal brakeshoes, he still has the major part of its brake lining left in contact with the disc. At his leisure in a reasonably long time after the start of the signal the operator can have the brakeshoes replaced.

According to a further feature of my invention, this bend line is eccentrically located on the backing plate and is directed generally toward the center of the disc. This permits most effective transfer of force from the piston to the disc while preventing to a maximum extent the squeal hitherto characteristic of disc brakes omitting the improvements of the aforementioned application and patent.

BRIEF DESCRIPTION OF THE FIGURES

These and other features, objects, and advantages of my invention will be described in the following, with reference to the drawing in which.

SPECIFIC DESCRIPTION

Figure 1:
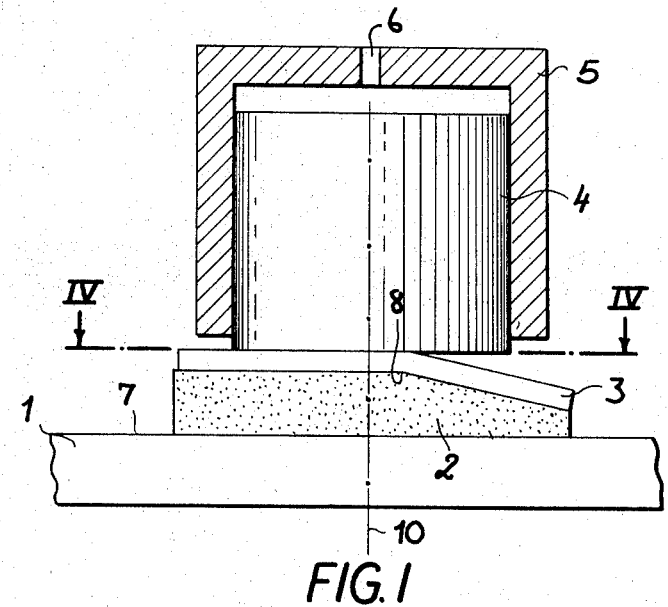
FIG. 1 is a partial sectional view through a disc brake equipped with the brakeshoe according to my invention.

FIG. 1 shows a disc brake as described in the commonly assigned application Ser. No. 700,515 filed on 25 Jan. 1968 by Juan Belart and entitled "Adjusting Device for Disc Brake," now U.S. Pat. No. 3,498,423. This brake has a brake disc 1 which is engaged by a brakeshoe comprising a brake lining 2 mounted on a backing plate 3. A piston 4, axially displaceable in a cylinder 5 which is pressurizable through a port 6, urges the lining 2 against a braking surface 7 of the disc 1.

Figure 5:
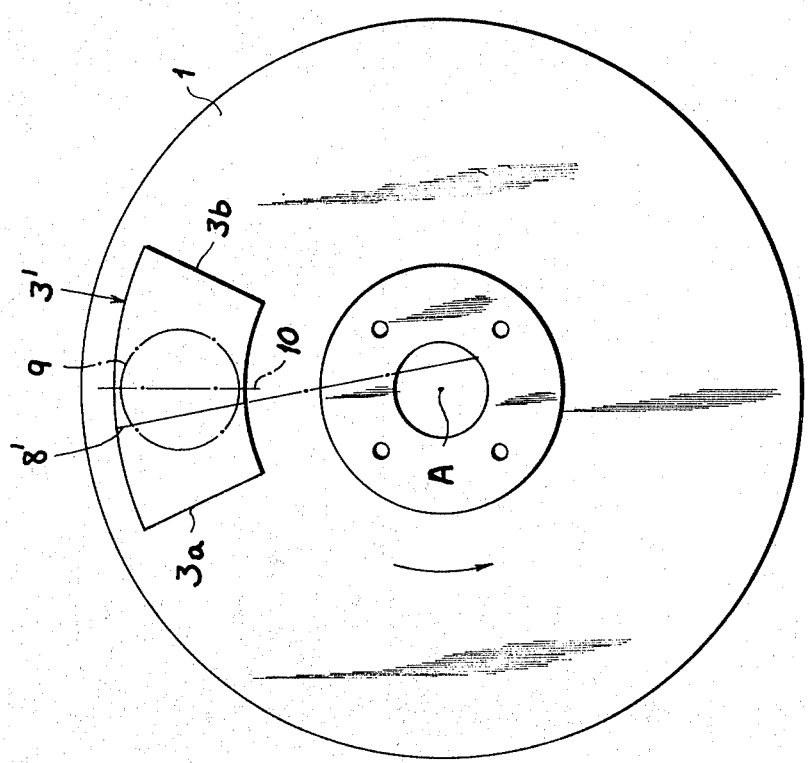
FIG. 5 is a view similar to FIG. 4 showing a further embodiment of my invention.
Figure 4:
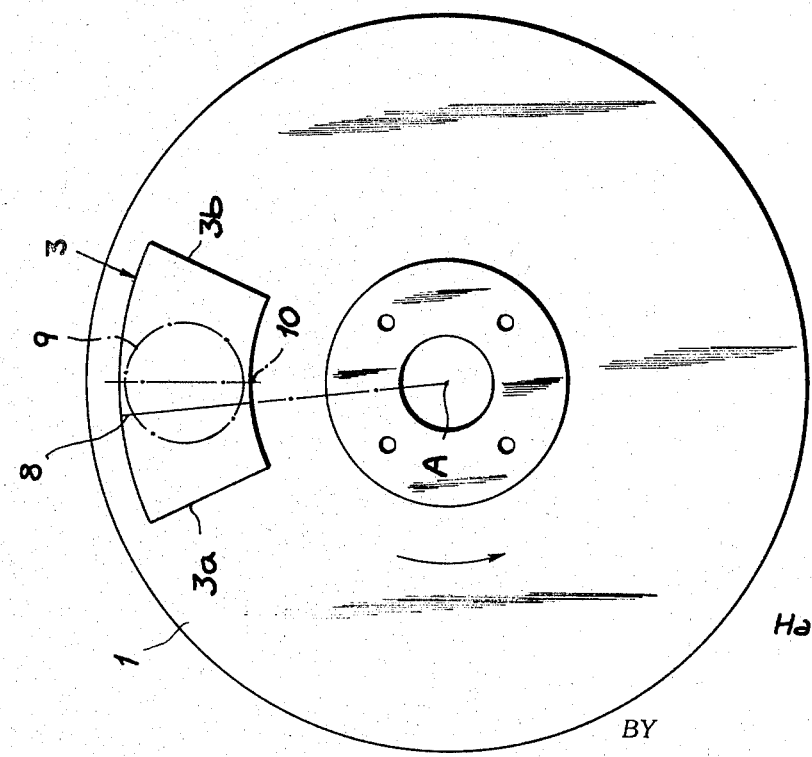
FIG. 4 is a view taken along line IV–IV of FIG. 1.

The backing plate 3 has a straight ridge or bend line 8 directed at the center A of the disc 1 seen in FIG. 4, this plate being bounded by a trailing edge 3a and a leading edge 3b. An alternate backing plate 3 has a bend line 8' which lies on a chord of the disc (FIG. 5). In either case the ridge line 8 or 8' lies within the axial projection 9 of the outline of the piston 4 on the disc, thus within the path of the piston and is offset toward trailing edge 3a; from a centerline 10 of the brakeshoe which intersects the axis of the piston 4.

Figure 2:
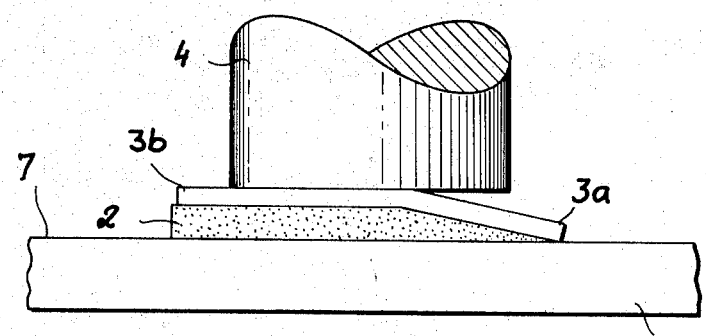
FIGS. 2 and 3 are views similar to FIG. 1 showing the brake lining in advancing states of wear.

FIG. 2 shows the brake lining 2 worn to the point where the trailing edge 3a contacts the disc 1 and thereby creates an audible signal for the driver.

Figure 3:
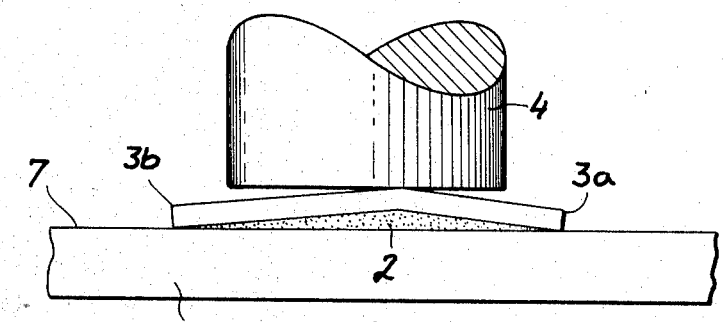

In FIG. 3 a fully worn out brakeshoe is shown. In this terminal position both the trailing edge 3a and the leading edge 3b contact the disc 1 so that only on deformation of the plate 3 can the residue of lining 2 effectively contact the disc 1. Ridge 8, separating the two plate portions which diverge at an obtuse angle toward the disc and are bounded by edges 3a and 3b, respectively, points toward the piston 4 bearing upon the plate 3.

There is a reasonably long period of completely safe braking between the conditions shown in FIGS. 2 and 3, during which ample time exists to have the old brakeshoes replaced. If, for some reason, the audible signal is ignored, the braking characteristics of the vehicle will be slowly changed, requiring more pressure on the brake pedal, to act as a further warning for the driver. In no case is there a sudden failure of braking due to a total lack of brake lining on the brakeshoe.

The improvement described and illustrated is believed to admit of many modifications within the ability of persons skilled in the art, all such modifications being considered within the spirit and scope of the invention except as limited by the appended claims.

I claim:

1. In a disc brake having a piston axially displaceable toward a braking surface of a brake disc to urge a brakeshoe thereagainst, the brakeshoe comprising a metallic backing plate engageable by said piston and a brake lining on said backing plate confronting said braking surface, the improvement wherein said backing plate has two portions adjoining each other at an obtuse angle along a ridge line lying in the path of said piston, said portions being respectively bounded by a leading edge and a trailing edge; said backing plate being movable under pressure of said piston, upon an erosion of said brake lining at both said edges, into a terminal position in which said braking surface contacts both said edges and a residual layer of brake lining therebetween, with said ridge line pointing toward said piston.

2. The improvement defined in claim 1 wherein said ridge line is offset from the axis of said piston.

3. The improvement defined in claim 1 wherein said ridge line lies along a radius of said disc.

4. The improvement defined in claim 1 wherein said ridge line lies along a chord of said disc.

5. The improvement defined in claim 1 wherein said ridge line lies closer to said trailing edge than to said leading edge.